United States Patent Office 3,786,032
Patented Jan. 15, 1974

3,786,032
VINYL POLYMERIZATION
James Robert Jennings and David Gavin Simon, Runcorn, England, assignors to Imperial Chemical Industries Limited, London, England
No Drawing. Filed Nov. 9, 1971, Ser. No. 197,153
Claims priority, application Great Britain, Nov. 20, 1970, 55,244/70, 55,245/70
Int. Cl. C08f 1/34
U.S. Cl. 260—91.7     27 Claims

ABSTRACT OF THE DISCLOSURE

Polymerization of vinyl or vinylidene halides using as initiator a mixture of a transition metal compound and an organoaluminum or organozinc compound including a ligand derived from an oxime or a hydroxy ester.
Also, initiator compositions for use in such a process.

This invention relates to the polymerization of vinyl halides, and to catalysts suitable for such polymerizations.

It is known to polymerize α-olefins using, as catalyst, a mixture of a transition metal salt and an alkyl aluminum compound (Ziegler catalysts). Such catalysts are, less suitable for the polymerization of polar monomers, such as the vinyl or vinylidene halides.

It has been proposed to modify conventional Ziegler catalysts so as to make them more suitable for polymerization of vinyl halides. For example, British Pat. No. 1,119,746 of Apr. 7, 1967 (Chisso Corporation) describes and claims a method for polymerizing at least one vinyl compound of the general formula

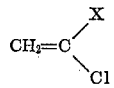

in which X is a hydrogen or a chlorine atom, which comprises polymerizing said vinyl compound by the use of a modified Ziegler type catalyst consisting of (a) a compound of a transition metal, (b) an organoaluminum compound and (c) an aliphatic alcohol having from 2 to 10 carbon atoms and at least one substituent selected from an amino radical, nitrile radical or a halogen atom.

It has now been discovered that certain modified Zielger catalysts are particularly suitable for polymerization of vinyl and vinylidene halides.

According to one aspect of the present invention, we provide a process for the polymerization of vinyl halides of vinylidene halides by contacting the monomer to be polymerized with a catalyst composition including as first component a compound of a transition metal of Group IV-A to VI-A of the Periodic Table of the Elements and as second component the product of reacting an organoaluminum or organozinc compound with an oxime or a hydroxy ester as hereinafter defined.

(All references to the Periodic Table are to the version of the Periodic Table of the Elements printed inside the back cover of "Advanced Inorganic Chemistry" by F. A. Cotton and G. Wilkinson, 2nd edition, Interscience Publishers, 1966.)

Particularly suitable transition metal compounds are those of the first long period of the Periodic Table, especially titanium and vanadium. Titanium is particularly preferred. Suitable transition metal compounds include the halides, oxyhalides, alkoxides, alkoxyhalides, alkoxyacetylacetonates, acetoxyhalides, or acetylacetonates.

The oxidation state of the transition metal may vary during the polymerization reaction but, preferably, the transition metal is in a high oxidation state, at least initially, as in vanadium oxytrichloride or titanium tetrachloride.

The oxime may be an aldoxime or a ketoxime, and may be aliphatic or aromatic, provided that it is not hindered, sterically or otherwise, from complexing with the aluminum or zinc. Suitable oximes thus include cyclohexanone oxime, benzophenone oxime, acetophenone oxime, diacetyloxime, acetoxime, diethylketoxime, acetaldoxime, propionaldoxime, glyoxime, furfuraldoxime, crotonaldoxime or acrolein oxime. Preferably, the oxime is a ketoxime, particularly a ketoxime including a methyl group, as in acetoxime.

For those oximes where both syn and anti forms exist, either or both isomers may equally be used.

"Hydroxy ester" includes a partial ester of a ployhydric alcohol wherein at least one of the alcohol hydroxy groups remains unesterified, that is compounds including the grouping:

$$-\overset{O}{\underset{\|}{C}}-O-Z-OH$$

as well as esters of hydroxy substituted carboxylic acids such as:

$$HO-Z-\overset{O}{\underset{\|}{C}}-O-R'$$

where Z is an organic residue and R' is an organic group, for example, alkyl.

Particularly suitable hydroxy esters are the mono-esters of diols, for example, ethylene glycol. Suitable esters thus include the monocarboxylates of ethylene glycol, for example, the mono-formic, -acetic or -propionic esters:

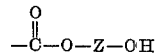

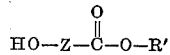

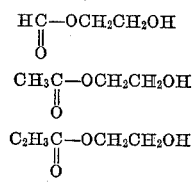

The second component of the catalyst composition may be prepared by mixing an organoaluminum or organozinc compound with a stoichiometric quantity of an oxime or a hydroxy ester, in liquid solution in a convenient solvent, for example toluene.

Without prejudice to the invention, this reaction may be represented by the following reaction schemes:

Oxime ligands

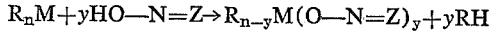

Hydroxyester ligands

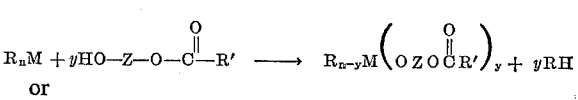

or

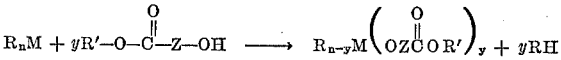

where Z is an organic residue; R and R' are organic groups, particularly alkyl, and may all be the same or different; M is aluminum or zinc, preferably aluminum; and $n$ and $y$ are integers, $n$ being a number as required to satisfy the valency requirements of the metal M and $y$ being a number between 1 and $n-1$ inclusive.

Preferably at least one of the groups R is a hydrocarbyl group, and preferably each such hydrocarbyl group is an alkyl group.

It may be preferable for only one ligand in the second component of the catalyst to be derived from an oxime or a hydroxy ester, the remaining ligands being, for example alkyl, such as methyl or ethyl.

It will be appreciated that the structure of the oxime or hydroxy ester should not be such that the hydroxyl group is hindered, sterically or otherwise, from complexing with the aluminum or zinc.

The organoluminum or organozinc compounds produced as described above may be isolated from the solution in which they were prepared, but it will be appreciated that it is more convenient to mix the solution with the transition metal compound without further treatment, either in the polymerization vessel or as a separate step. This procedure is particularly applicable if only small amounts of solvent have been employed.

It will also be apparent that the second component of our catalyst composition may either be prepared in a separate operation, as described above, or the organoaluminum or organozinc compound, the oxime or hydroxy ester and the transition metal compound may be introduced separately into a polymerization vessel, thus forming the catalyst components during the polymerization reaction. Such in situ preparation is equally within the scope of our invention.

It is preferred that, in catalyst compositions according to our invention, there should be at least one atom of aluminum or zinc for each atom of transition metal. The upper limit to the atomic proportion of aluminum or zinc to transition metal will depend on reaction conditions, and simple experiment will readily show when further addition of aluminum or zinc ceases to have any appreciable effect. Conveniently, the atomic ratio of aluminum or zinc to transition metal may be from about 1:1 to about 10:1, a suitable value being about 3:1.

Monomers which may be polymerized using the above catalyst compositions are the vinyl halides, for example vinyl chloride or vinyl bromide, and the vinylidene halides. A preferred monomer is vinyl chloride.

While our catalysts are particularly suitable for homopolymerizations, we do not wish to exclude the copolymerization of more than one vinyl halide and/or vinylidene halide.

The catalyst components may be employed in liquid solution. Preferably, the monomer being polymerized acts as the solvent for the catalyst components, together, possibly, with a small amount of an inert solvent as required to ensure that the catalyst components interact one with another in liquid solution. Alternatively the monomer may be in liquid solution in an inert solvent in which the catalyst components are soluble, for example, tetrahydrofuran. Particularly convenient solvents are aliphatic or aromatic hydrocarbons, for example, pentane, hexane, heptane, octane, benzene, or toluene, and such solvents are therefore preferred.

According to a further aspect of the present invention, the first component of the catalyst composition may be chemically bonded to a substantially inert, solid matrix material having a hydroxylic surface which is free from adsorbed water.

By a "hydroxylic surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with the transition metal compound, the bulk of the matrix material is chemically inert. Suitable matrix materials include inorganic oxides. Particularly good examples of such matrix materials are silica and alumina or mixtures thereof. These comprise a matrix of silicon or aluminum and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica- and alumina-based materials containing small amounts of other suitable inorganic oxides, such as magnesium oxide and zinc oxide.

It is essential that the matrix material is freed from adsorbed water, as this would merely react with and destroy the catalyst component. The matrix materials may be readily freed from such adsorbed water by, for example, a simple thermal treatment.

The catalyst component is bonded to the matrix by reacting the component, preferably in solution, with the matrix. A condensation reaction occurs between the acidic proton of the matrix hydroxyl groups and the atoms or groups associated with the transition metal. The fact that the product is a chemical entity, not a physical mixture such as a transition metal compound physically adsorbed on a granular matrix, may be demonstrated by removing the product from the reactants and washing it with a solvent which would remove any adsorbed transition metal compound from the matrix. When this is done, the compound remains on the matrix. Contrary to this, when transition metal compounds are mixed with an inert matrix containing no reactive hydroxylic groups, for example silica which has been calcined at 1200° C., although the compound is adsorbed on the matrix, it is readily removed by washing the product with a suitable solvent.

The number of reactive hydroxylic groups present in a given weight of matrix will depend upon its nature (for example, whether it is silica or alumina) and its condition (for example, its surface area and the treatment it has received to remove adsorbed water). Thus the precise composition of supported catalysts prepared according to our invention may vary from one batch or sample to another of the same matrix material; but successive portions of the same material prepared under identical conditions will give products having the same composition.

The concentration of reactive hydroxylic groups in a particular batch of matrix material may be readily determined by titrating a sample of the matrix with a transition metal compound or a Grignard reagent until reaction ceases. The matrix may then be coated with the transition metal compound by adding a solution of the appropriate transition metal compound to the matrix material.

The matrix material may either be in solid form, for example powder or pellets, or be in suspension in an inert diluent. Preferably, the proportions of transition metal complex and matrix material are so chosen that all the reactive hydroxylic groups of the matrix are reacted with the transition metal compound.

The coated matrix may be employed in dry form, or in the form of a slurry in a convenient diluent, for example an inert, liquid hydrocarbon, such as hexane or toluene.

The matrix material should be in a form having a large surface area/weight ratio. The particle size of the matrix may be decreased by any suitable method of comminution, though the use of ultrasonic dispersion is preferred. The particle size of the matrix material may be reduced before or after reaction with the transition metal compound, but, if this is done after reaction with the transition metal compound, rigorous precautions must be taken to exclude air and water.

The second component of the catalyst composition is supplied separately during the polymerization, in solution or suspension in an inert solvent (or diluent), or in the monomer to be polymerized.

As indicated above, our catalyst compositions are suitable for solution or bulk polymerizations, particularly the latter. Alternatively, when supported catalysts are employed, as described above, a gaseous monomer may be contacted with the coated matrix.

The exact conditions under which the polymerization is performed may depend on the monomer being polymerized and the catalyst composition being employed, but optimum conditions for any combination of monomer and catalyst may be readily determined by routine experiment.

Rates of polymerization tend to increase with rise in temperature, but excessive temperatures may reduce the molecular weight of the product polymer, and for practical purposes, the temperature should not exceed about 100° C. to 130° C. Reaction is possible at about −80° C., but polymerization is slow at such a temperature and it is preferred to operate above about −25° C. For economic rates of reaction, in combination with adequate molecular weight products, a convenient temperature range is from about +40° C. to about 70° C.

Pressure is not critical, and it is convenient to operate at the autogenous pressure of the monomer.

The catalyst concentration employed is not critical and will depend on reaction conditions and the activity of the chosen catalyst composition. A convenient concentration is about 3 moles of monomer per mmole of transition metal, a molar concentration of transition metal of 0.3%. Depending on the activity of the catalyst, higher or lower concentrations may be employed, and lower concentrations may be desirable, in order to reduce the proportion of catalyst residues in the product polymer. A convenient concentration range is from 1 to 40 moles of monomer for each mmole of transition metal, a catalyst concentration of 0.1 to 0.0025 mole percent of transition metal.

The catalyst components may be added to the monomer in any order, but it is preferred that the second component is contacted with the monomer not later than addition of the transition metal component.

Since the catalyst components are generally air- and water-sensitive, it is desirable that the catalyst is prepared and used in dry, oxygen-free conditions. This may conveniently be achieved by using dry monomers and by working under a blanket of dry, inert gas, for example oxygen-free nitrogen.

The activity of the catalyst composition may be at a maximum if it is prepared immediately before use, either as a separate reaction or in the polymerization vessel, and such fresh preparation is therefore preferred.

It is necessary that the monomer is free of impurities, for example oxygen and water, which will react adversely with the catalyst. It is therefore desirable that the monomer is purified and dried before use. This may be achieved in conventional manner, by distillation or by contacting the monomer with a material which will remove water and impurities, for example a molecular sieve or alumina. When the latter procedure is employed, the monomer may be liquid or gaseous, but purification may be more efficient if the monomer is gaseous.

Since traces of acetylenes may have an adverse effect on the activity of the catalyst, is is preferred to employ vinyl monomers, for example, vinyl chloride, which have been prepared from ethylene.

Polymerizations according to our invention may be performed batchwise or continuously, as required.

The catalyst compositions described above are believed to be novel, and thus according to a further aspect of the present invention, we provide, as a new composition of matter, a catalyst suitable for use in the polymerization of vinyl halides or vinylidene halides as described above which comprises (a) a compound of a transition metal of Group IV–A to VI–A of the Periodic Table of the Elements, and either
(b) an organoaluminum or organozinc compound containing a ligand derived from an oxime or a hydroxy ester, as hereinbefore defined, or
(c) a mixture of an organoaluminum or organozinc compound and an oxime or a hydroxy ester, as hereinbefore defined.

The invention is now illustrated by the following examples, in which catalyst concentrations are quoted as mmoles of transition metal per litre of liquid monomer.

In all cases, the aluminum or zinc components of the catalyst were prepared by transferring a measured amount of a standard toluene solution of the appropriate organoaluminum or organozinc compound to a nitrogen-filled flask at −78° C. and adding dropwise an equimolar amount of oxime or hydroxy ester, in solution in toluene.

This reaction is exothermic, and precautions were taken to control the rise in temperature.

The resultant solution was use as such.

K-values (proportional to average molecular weight) of the product polymers, where quoted, were measured as follows:

A sample of the polymer was dissolved in ethylene dichloride, as a 0.5% (weight/volume) solution, by refluxing the polymer with ethylene dichloride for 1 hour.

The relative viscosity ($\eta$) of this solution was measured at 25° C. in an Ostwald Viscometer A, the relative viscosity being calculated as $$\frac{\text{Flow time of solution}}{\text{Flow time of pure solvent}}$$

The K-value was then calculated from Fikentscher's equation (Zellulosechem. 13, 58 (1932))

$$\log_{10} \eta = \left(\frac{75k^2}{1+1.5kc+k}\right)$$

where $\eta$ = relative viscosity
$c$ = concentration of polymer (g./100 ml.)

and $K = 10^3 k$

The Vicat softening points of product polymers, where quoted, were measured on a moulded sample prepared as follows:

300 g. of polymer were thoroughly mixed with dioctyltin mercaptide (2.295 g.), epoxidized soya bean oil (0.705 g.) and cetyl stearyl alcohol (1.50 g.). The mixture was milled for 5 minutes in a roll mill having rolls 30 cm. x 15 cm. diameter with the front roll rotating at 25–27 revolutions per minute (r.p.m.) and the back roll at 32–35 r.p.m. The temperature of the front roll was 160° C. and of the back roll was 150° C. The crepe thickness was 1.651 mm. After milling, two 3.81 x 2.54 cm. samples were stamped from the crepe and moulded and pressed together in a mould 3.81 x 2.54 x 0.3 cm. at a temperature of 175° C., for 2 minutes under no load and then for 28 minutes under a 30 ton load. The moulded sample was then cooled rapidly under a 50 ton load.

The moulded sample (3 mm. thick) was immersed in a liquid bath and a vertical rod having a hardened circular tip 3 mm. long and 1.000 mm.$^2$ in cross-sectional area was pressed down onto the sample under a 1 kg. load, according to the procedure of British Standard 2782: 1970— Method 102D. The liquid bath was heated at a uniform rate of 50° C./hour and the Vicat softening point taken as the temperature at which the indenting tip had penetrated 1.0 mm. into the sample.

Intrinsic viscosities of product polymers, where quoted, were measured in cyclohexanone at 25° C.

Conversions, where quoted, are calculated on the basis of initial monomer and catalyst activities are expressed as g. polymer/mmole of transition metal/hour.

EXAMPLES 1–35

(Low temperature polymerization of vinyl chloride)

A number of polymerizations were performed in a glass vessel fitted with a stirrer, jacketed dropping funnel, solid carbon dioxide condenser, serum cap and a nitrogen inlet. When not in use, the vessel was continuously purged with dry, oxygen-free nitrogen.

The dropping funnel was cooled to −80° C. and was charged with a measured amount of liquid vinyl chloride, which had been dried by passing it through a 1 m. column packed with type 4A activated molecular sieve.

The nitrogen purge was stopped, but the reaction vessel was kept full of nitrogen and was cooled to the required temperature. The vinyl chloride was discharged from the dropping funnel and the stirrer was actuated. The calculated quantity of the catalyst second component, as a solution in toluene, was injected through the serum cap, followed by the calculated quantity of the transition metal component. A distinctive coloration resulted from formation of the catalyst and a rapidly developed turbidity indicated immediate formation of polymer, which is insoluble in vinyl chloride.

After the appropriate time had elapsed from addition of the transition metal component, polymerization was stopped by addition of methanol to the reaction vessel.

The product polymer was removed from the reaction vessel, washed successively with 5% (by weight) methanolic hydrochloric acid, methanol, and 40–60° petroleum ether and dried in a vacuum oven at 60° C.

The dry polymer was weighed and the catalyst activity calculated.

The results are shown in Table I.

EXAMPLES 43–74

(Polymerization of vinyl chloride with supported catalysts)

$\gamma$-Alumina was dried by heating it to 180° C. in a stream of dry nitrogen for 4 hours. A toluene solution of titanium tetrachloride was added to the alumina until evolution of HCl ceased. The coated alumina was washed with dry pentane and dried. Analysis of a sample showed the titanium content to be 9.90% by weight.

A reaction vessel was charged with vinyl chloride at −20° C. A toluene solution of acetoximatodiethylaluminum, prepared by mixing equimolar amounts of acetoxime $((CH_3)_2C:NOH)$ and triethylaluminum, was added to the vinyl chloride, followed by the calculated amount of the coated alumina. Reaction started immediately and was continued for 6 hours while the reaction mixture was

TABLE I

| Ex. | Organometallic compound | Oxime or hydroxy ester | Transition metal compound | Concentration of transition metal compound mmoles/litre | Molar ratio Al or Zn/transition metal | Temperature, °C. | Reaction time, hrs. | Catalyst activity, g. polymer/ mmole of transition metal/hour | Intrinsic viscosity of polymer |
|---|---|---|---|---|---|---|---|---|---|
| 1 | Al(C$_2$H$_5$)$_3$ | Acetoxime | VOCl$_3$ | 15 | 3:1 | −20 | 6 | 1.3 | 0.296 |
| 2 | Al(C$_2$H$_5$)$_3$ | do | TiCl$_4$ | 15 | 3:1 | −20 | 3 | 3.1 | 0.935 |
| 3 | Al(C$_2$H$_5$)$_3$ | Cyclohexanone oxime | VOCl$_3$ | 15 | 3:1 | −20 | 6 | 1.1 | |
| 4 | Al(C$_2$H$_5$)$_3$ | Acetoxime | TiCl$_4$ | 12.6 | 3:1 | −35 | 12 | 0.6 | 1.1 |
| 5 | Al(C$_2$H$_5$)$_3$ | do | VOCl$_3$ | 7.3 | 3:1 | −35 | 8 | 2.2 | 1.0 |
| 6 | Al(C$_2$H$_5$)$_3$ | do | TiCl$_4$ | 7.3 | 3:1 | −20 | 11.5 | 1.5 | |
| 7 | Al(C$_2$H$_5$)$_3$ | do | VOCl$_3$ | 7.5 | 3:1 | −20 | 17 | 1.9 | 1.45 |
| 8 | Al(C$_2$H$_5$)$_3$ | 2-acetoxyethanol (ethylene glycol mono-acetate) | VOCl$_3$ | 15 | 3:1 | −20 | 6 | 3.4 | 1.98 |
| 9 | Al(C$_2$H$_5$)$_3$ | do | VOCl$_3$ | 9.0 | 3:1 | −20 | 7 | 3.9 | 1.7 |
| 10 | Al(C$_2$H$_5$)$_3$ | do | VO(OC$_2$H$_5$)$_3$ | 15 | 3:1 | −20 | 6 | 2.1 | |
| 11 | Al(C$_2$H$_5$)$_3$ | do | VOCl$_3$ | 7.9 | 5.9:1 | −35 | 10 | 2.6 | 2.28 |
| 12 | Al(C$_2$H$_5$)$_3$ | do | VOCl$_3$ | 7.3 | 3:1 | −35 | 12 | 2.6 | 1.1 |
| 13 | Zn(C$_2$H$_5$)$_2$ | do | VOCl$_3$ | 15 | 3:1 | −20 | 6 | 0.6 | |
| 14 | Al(C$_2$H$_5$)$_3$ | do | VOCl$_3$ | 9.0 | 3:1 | −20 | 1 | 12.0 | 1.26 |
| 15 | Al(C$_2$H$_5$)$_3$ | Acetoxime | VO(OCH$_2$CH$_2$OCH$_3$)$_3$ | 15 | 3:1 | −20 | 6 | 0.9 | |
| 16 | Al(C$_2$H$_5$)$_3$ | do | VO(OCH$_2$CH$_2$NH$_2$)$_3$ | 15 | 3:1 | −20 | 6 | 0.3 | |
| 17 | Al(C$_2$H$_5$)$_3$ | 2-acetoxyethanol | VO(OCH$_2$CH$_2$OCH$_3$)$_3$ | 20 | 2.25:1 | −20 | 6 | 0.2 | |
| 18 | Al(C$_2$H$_5$)$_3$ | do | VOCl$_3$ | 22.5 | 1:1 | −70 | 23 | 0.01 | |
| 19 | Al(C$_2$H$_5$)$_3$ | do | VOCl$_3$ | 7.5 | 3:1 | −70 | 24 | 0.2 | 1.33 |
| 20 | Zn(C$_2$H$_5$)$_2$ | Acetoxime | VOCl$_3$ | 15 | 3:1 | −20 | 6 | 1.3 | |
| 21 | Zn(C$_2$H$_5$)$_2$ | do | TiCl$_4$ | 15 | 3:1 | −20 | 6 | 0.7 | |
| 22 | Al(C$_2$H$_5$)$_3$ | 2-acetoxyethanol | CrO$_2$Cl$_2$ | 15 | 3:1 | −20 | 6 | 0.6 | |
| 23 | Al(C$_2$H$_5$)$_3$ | do | VO(OC$_2$H$_5$)$_3$ | 20 | 1.5:1 | −20 | 6 | 1.5 | 1.16 |
| 24 | Al(C$_2$H$_5$)$_3$ | do | VOCl$_3$ | 15 | 3:1 | −40 | 6 | 1.4 | 0.52 |
| 25 | Al(C$_2$H$_5$)$_3$ | Acetoxime | VOCl$_3$ | 15 | 3:1 | −40 | 6 | 0.6 | 0.15 |
| 26 | Al(C$_2$H$_5$)$_3$ | 2-acetoxyethanol | VOCl$_3$ | 15 | 3:1 | −50 | 6 | 0.5 | 1.15 |
| 27 | Al(C$_2$H$_5$)$_3$ | do | VOCl$_3$ | 15 | 3:1 | −55 | 6 | 0.3 | 0.57 |
| 28 | Al(C$_2$H$_5$)$_3$ | do | VOCl$_3$ | 15 | 3:1 | −70 | 8 | 0.1 | 0.31 |
| 29 a | Al(C$_2$H$_5$)$_3$ | do | VOCl$_3$ | 30 | 3:1 | −20 | 6 | 1.2 | 7.0 |
| 30 b | Al(C$_2$H$_5$)$_3$ | do | VOCl$_3$ | 17 | 2.66:1 | −20 | 6 | 2.0 | |
| 31 | Al(C$_2$H$_5$)$_3$ | Diethylketoxime | TiCl$_4$ | 15 | 3:1 | −20 | 5 | 1.7 | |
| 32 | Al(C$_2$H$_5$)$_3$ | Acetoxime | ZrCl$_4$ | 25 | 3:1 | −20 | 5 | 0.08 | |
| 33 | Al(C$_2$H$_5$)$_3$ | Crotonaldoxime | TiCl$_4$ | 15 | 3:1 | −20 | 4.75 | 1.4 | |
| 34 | Al(i-C$_4$H$_9$)$_3$ | 2-acetoxyethanol | VOCl$_3$ | 15 | 3:1 | −20 | 6 | 0.1 | |
| 35 | Al(C$_2$H$_5$)$_3$ | Ethyl lactate | ZrCl$_4$ dietherate | 5.0 | 5:1 | −20 | 5 | 1.6 | | a Vinyl chloride in admixture with an equal volume of hexane.
b Vinyl chloride in admixture with 4 times its volume of hexane.

EXAMPLES 36–42

The procedure of Examples 1–35 was repeated using other monomers.

The results are shown in Table II.

stirred. The above operations were performed under a nitrogen blanket.

Polymerization was stopped by addition of methanol to the reaction mixture. The product polymer was washed with methanolic hydrochloric acid, filtered, washed again

TABLE II

| Example | Monomer | Organometallic compound | Oxime or hydroxy ester | Transition metal compound | Concentration of transition metal compound mmoles/litre | Molar ratio Al/transition metal | Temperature, °C. | Reaction time, hrs. | Catalyst activity, g. polymer/mmole of transition metal/hour |
|---|---|---|---|---|---|---|---|---|---|
| 36 | Vinyl bromide | Al(C$_2$H$_5$)$_3$ | Acetoxime | TiCl$_4$ | 300 | 5:1 | −20 | 5 | 0.07 |
| 37 | Vinylidene chloride | Al(C$_2$H$_5$)$_3$ | do | TiCl$_4$ | 21 | 2.25:1 | +20 | 2.5 | 2.5 |
| 38 | do | Al(C$_2$H$_5$)$_3$ | do | TiCl$_4$ | 15 | 3:1 | 20 | 2.5 | 3.5 |
| 39 | do | Al(C$_2$H$_5$)$_3$ | do | TiCl$_4$ | 15 | 3:1 | 20 | 3.5 | 5.1 |
| 40 | do | Al(C$_2$H$_5$)$_3$ | do | TiCl$_4$ | 15 | 3:1 | 20 | 3.5 | 4.6 |
| 41 | do | Al(C$_2$H$_5$)$_3$ | Ethyl lactate | VOCl$_3$ | 15 | 3:1 | 20 | 5 | 6.1 |
| 42 | do | Al(C$_2$H$_5$)$_3$ | do | VOCl$_3$ | 15 | 3:1 | 20 | 5 | 6.4 | with methanol, and dried in a vacuum oven at 60° C. The results are shown in Table III.

TABLE III

| Example | Ti concentration, mmoles/litre | Molar ratio Al/Ti | Catalyst activity, g. polymer/ mmole of Ti/hr. |
|---|---|---|---|
| 43 | 15 | 3:1 | 2.2 |
| 44 | 15 | 3:1 | 2.0 |
| 45 | 45 | 1:1 | 0.9 |
| 46 | 45 | 1:1 | 0.9 |

EXAMPLE 47

The procedure of Examples 43–46 was repeated, but the alumina was dried by refluxing it in xylene, rather than by heat treatment.

Percent Ti on alumina (by weight) _____ 4.36
Ti concentration _____mmole/litre__ 15
Molar ratio Al/Ti _____ 3:1
Reaction time _____hours__ 5
Catalyst activity _____g./mmole of Ti/hr__ 0.2

EXAMPLE 48

The procedure of Examples 43–46 was repeated, except that the temperature employed to dry the alumina was 100° C.

Percent Ti on alumina (by weight) _____ 5.21
Ti concentration _____mmole/litre__ 15
Molar ratio Al/Ti _____ 3:1
Reaction time _____hours__ 5
Catalyst activity _____g./mmole of Ti/hr__ 0.7

EXAMPLE 49

The procedure of Example 48 was repeated, with the acetoximetodiethylaluminum replaced by the 1:1 complex of triethylaluminum and acetoxyethanol (ethylene glycol monoacetate).

Percent Ti on alumina (by weight) _____ 5.21
Ti concentration _____mmole/litre__ 15
Molar ratio Al/Ti _____ 3:1
Reaction time _____hours__ 5
Catalyst activity _____g./mmole of Ti/hr__ 1.6

EXAMPLE 50

γ-Alumina was dried at 550° C. in vacuo for 24 hours. A toluene solution of titanium tetrachloride was added to the alumina until evolution of HCl ceased. The coated alumina was washed with dry pentane and dried.

A reaction vessel was charged with vinyl chloride at −20° C. The appropriate amount of the coated alumina was stirred into the vinyl chloride, followed by a toluene solution of acetoximatodiethylaluminium. The reaction mixture was stirred under a nitrogen blanket for 5 hours, when polymerization was stopped by addition of methanol. The product polymer was washed with methanolic hydrochloric acid, filtered, washed with methanol and dried in a vacuum oven at 60° C.

The results are shown below.

Percent Ti on alumina (by weight) _____ 5.28
Ti concentration _____mmole/litre__ 30
Molar ratio Al:Ti _____ 3:1
Catalyst activity _____g./mmole Ti/hr__ 1.1

Silica gel was dried by heating it overnight at 450° C. A toluene solution of titanium tetrachloride was added until evolution of HCl ceased. The coated silica was washed with dry pentane and dried. Analysis of a sample showed that the amount of titanium present was 0.742% by weight.

A reaction vessel was charged with vinyl chloride at −20° C. The appropriate amount of the coated silica was stirred into the vinyl chloride, followed by acetoximatodiethylaluminum (as a 1 M solution in toluene).

The mixture was stirred for 5 hours under a nitrogen blanket and reaction was then stopped by addition of methanol. The white polymer was washed with methanolic hydrochloric acid, filtered, washed with methanol and dried in a vacuum oven at 60° C.

The results are shown in Table IV.

TABLE IV

| Example | Ti concentration, mmoles/litre | Molar ratio Al/Ti | Catalyst activity, g./mmole of Ti/hr. |
|---|---|---|---|
| 51 | 6.0 | 7.6:1 | 2.4 |
| 52 | 12 | 7.4:1 | 3.6 |

The procedure of Examples 51 and 52 was repeated except that the acetoximatodiethylaluminum was added to the vinyl chloride before the coated silica.

The results are shown in Table V.

TABLE V

| Example | Ti concentration, mmoles/litre | Molar ratio Al/Ti | Catalyst activity, g./mmole of Ti/hr. |
|---|---|---|---|
| 53 | 5.2 | 8.7:1 | 3.5 |
| 54 | 11 | 8.5:1 | 2.8 |

A number of experiments were performed using as catalyst components titanium tetrachloride on various matrix materials and acetoximatodiethylaluminum.

In each case, the matrix material was dried in a stream of dry nitrogen at the indicated temperature. Titanium tetrachloride, as a solution in toluene, was added to the dried matrix until evolution of HCl had ceased. The coated matrix was washed with pentane and dried.

A reaction vessel was charged with vinyl chloride at −20° C. The coated matrix and a toluene solution of acetoximatodiethylaluminum were added to the reaction vessel in the order indicated, and the reaction mixture was stirred.

The above operations were performed under a nitrogen blanket.

Polymerization was stopped by addition of methanol. The product polymer was washed with methanolic hydrochloric acid, filtered, washed with methanol and dried in a vacuum oven at 60° C.

The catalyst activity was calculated from the weight of dry polymer.

The results are shown in Table VI.

by injection of methanol (50 parts by volume). The product polymer was washed with methanolic hydrochloric acid and with methanol, and then dried in a vacuum oven at 60° C.

The results are shown in Table VII.

TABLE VI

| Example | Matrix | Drying temp., °C. | Drying time, hrs. | Percent Ti on matrix (by weight) | Concentration of transition metal compound, mmoles/litre | Molar ratio Al/Ti | Order of addition of catalyst components | Reaction time, hrs. | Catalyst activity, g./mmole of Ti/hr. |
|---|---|---|---|---|---|---|---|---|---|
| 55 | $Al_2O_3$ | 550 | 24 | 5.28 | 28 | 3.2:1 | Matrix added first | 5 | 1.1 |
| 56 | $Al_2O_3$ | 550 | 24 | 5.28 | 34 | 2.6:1 | Al added first | 3.5 | 2.1 |
| 57 | $Al_2O_3$ | 550 | 24 | 5.28 | 16 | 2.8:1 | Matrix added first | 5 | 1.5 |
| 58 | $Al_2O_3$ | 550 | 24 | 5.28 | 19 | 2.4:1 | Al added first | 5 | 1.0 |
| 59 | $SiO_2$ | 400 | 72 | 0.742 | 9.0 | 5:1 | Matrix added first | 5 | 1.6 |
| 60 | $SiO_2$ | 400 | 72 | 0.142 | 7.0 | 6.4:1 | Al added first | 5 | 2.7 |
| 61 | $SiO_2$ | 400 | 72 | 0.742 | 16 | 5.6:1 | do | 5 | 1.8 |
| 62 | $SiO_2$ | 400 | 72 | 0.742 | 18 | 5:1 | Matrix added first | 5 | 2.5 |
| 63 | $SiO_2$ | 400 | 72 | 0.742 | 7.0 | 3:1 | do | 5 | 1.7 |
| 64 | $SiO_2$ | 400 | 72 | 0.742 | 8.0 | 5:1 | do | 5 | 1.0 |
| 65 | $SiO_2$ | 400 | 72 | 0.742 | 12 | 3:1 | do | 5 | 1.0 |
| 66 | $SiO_2$ | 400 | 72 | 0.742 | 13 | 3:1 | Al added first | 5 | 0.8 |
| 67 | $SiO_2$ | 400 | 72 | 0.742 | 7.0 | 3:1 | do | 5 | 1.3 |
| 68 | $SiO_2$ | 400 | 72 | 0.742 | 7.0 | 5:1 | do | 5 | 3.5 |
| 69 | 25% $Al_2O_3$/75% $SiO_2$ a | 350 | 100 | 0.72 | 13 | 5:1 | do | 5 | 2.7 |
| 70 | 13% $Al_2O_3$/87% $SiO_2$ a | 350 | 100 | 1.00 | 12 | 5:1 | do | 5 | 2.1 |
| 71 | 25% $Al_2O_3$/75% $SiO_2$ a | 350 | 100 | 0.72 | 16 | 3:1 | do | 5 | 1.7 |
| 72 b | $ZnO/Al_2O_3$ | 650 | 24 | 3.03 | 21 | 3:1 | do | 5 | 0.5 |
| 73 | $SiO_2$ | 400 | 100 | 1.00 | 7.0 | 5:1 | do | 5 | 3.1 |
| 74 | $SiO_2$ | 400 | 100 | 1.00 | 9.0 | 1:1 | do | 5 | 0.7 | a By weight.
b Equal amounts of ZnO and $Al_2O_3$ mixed and heated to 650° C. to form a spinel.

EXAMPLES 75-161

(High temperature polymerization of vinyl chloride)

A stainless steel autoclave (1000 parts by volume) was fitted with a magnetically driven paddle stirrer, a pressure gauge, a thermocouple pocket, a nitrogen inlet and a second inlet.

Before use, the autoclave was backed out at 120° C. under vacuum and then was let down to atmospheric pressure with nitrogen and cooled to room temperature.

The autoclave was purged with dry, oxygen-free nitrogen and cooled to liquid nitrogen temperature. The catalyst components were added against a nitrogen purge, and the autoclave, still at liquid nitrogen temperature was evacuated.

Vinyl chloride (700 parts by volume) was distilled through a cold trap filled with molecular sieve at —80° C. into a graduated vessel which was immersed in liquid nitrogen. The vessel was evacuated and heated to —80° C. and the contents were distilled into the autoclave.

The autoclave was sealed and heated to 60° C. by means of a band heater, and the stirrer was started once the autoclave contents had liquified.

After the appropriate reaction period, the autoclave was cooled and vented, and polymerization was stopped

TABLE VII

| Example | Organometallic compound | Oxime or hydroxy exter | Transition metal compound | Concentration of transition metal compound, mmole/litre | Molar ratio Al/transition metal | Reaction time, hrs. | Catalyst activity, g./mmole of transition metal/hour | Intrinsic viscosity of polymer |
|---|---|---|---|---|---|---|---|---|
| 75 | $Al(C_2H_5)_3$ | Acetoxime | $TiCl_4$ | 4.3 | 3:1 | 2 | 30.8 | |
| 76 | $Al(C_2H_5)_3$ | do | $TiCl_4$ | 5.7 | 3:1 | 2 | 30.6 | 0.46 |
| 77 | $Al(C_2H_5)_3$ | do | $TiCl_4$ | 5.7 | 4:1 | 2 | 31.2 | |
| 78 | $Al(C_2H_5)_3$ | do | $TiCl_4$ | 5.7 | 6:1 | 2 | 17.8 | |
| 79 | $Al(C_2H_5)_3$ | 2-acetoxyethanol | $VOCl_3$ | 7.1 | 3:1 | 1.5 | 26.6 | 0.9 |
| 80 | $Al(C_2H_5)_3$ | do | $VOCl_3$ | 2.1 | 3:1 | 0.5 | 147 | |
| 81 | $Al(C_2H_5)_3$ | Acetoxime | $TiCl_4$ | 2.1 | 3:1 | 1 | 17.3 | |
| 82 | $Al(C_2H_5)_3$ | do | $TiCl_4$ | 2.1 | 3:1 | 2 | 9.7 | |
| 83 | $Al(C_2H_5)_3$ | do | $TiCl_4$ | 4.3 | 3:1 | 1 | 42.7 | |

A stainless steel autoclave (5 parts by volume) was fitted with an anchor type stirrer, a water-filled heating jacket, a thermocouple pocket, a pressure gauge, a calibrated Klinger gauge discharging into the autoclave, a sight glass (0.01 part by volume) and a nitrogen inlet.

Before use the autoclave was baked out at 100° C. under vacuum overnight, and was then let down to atmospheric pressure with nitrogen and cooled to ambient temperature.

The organoaluminum component of the catalyst, as a solution in toluene, was injected against a nitrogen purge. A small amount of vinyl chloride was added to the autoclave, which was then vented.

Vinyl chloride (4 parts by volume) was measured into the Klinger gauge and 3.5 parts by volume of this vinyl chloride was discharged into the autoclave by nitrogen pressure.

The slight glass was filled under nitrogen with the transition metal component of the catalyst and the remaining vinyl chloride (0.5 part by volume) was blown through the sight glass into the autoclave.

The pressure in the autoclave immediately increased and the autoclave was heated to 60° C. After the appropriate reaction time the autoclave was vented and cooled.

The results are shown in Table VIII.

TABLE VIII

| Ex. | Organometallic compound | Oxime or hydroxy ester | Transition metal compound | Concentration of transition metal compound, mmoles/litre | Molar ratio Al/transition metal | Reaction time, hrs. | Catalyst activity, g./mmole of transition metal/hour |
|---|---|---|---|---|---|---|---|
| 84 | $Al(C_2H_5)_3$ | Acetoxime | $TiCl_4$ | 6.5 | 3:1 | 1.5 | 39.5 |
| 85 | $Al(C_2H_5)_3$ | do | $TiCl_4$ | 3.1 | 3:1 | 4 | 16.0 |
| 86 | $Al(C_2H_5)_3$ | 2-acetoxyethanol | $VOCl_3$ | 15 | 3:1 | 2 | 8.7 |
| 87 | $Al(C_2H_5)_3$ | do | $VOCl_3$ | 8.0 | 3:1 | 1.5 | 37.6 |
| 88 | $Al(C_2H_5)_3$ | do | $VOCl_3$ | 3.8 | 3:1 | 4 | 15.5 |

A stainless steel autoclave (7.2 parts by volume) was fitted with an oil-filled heating jacket, a spiral stirrer, a nitrogen inlet, a vinyl chloride inlet, a vacuum inlet, and two pump inlets.

Before use, the autoclave was baked out at 130° C. under a vacuum better than 0.1 torr for at least 1 hour.

The evacuated autoclave was cooled to ambient temperature, and vinyl chloride was fed from a nitrogen-pressurized cylinder into the autoclave through a 1.5 m. column packed with type 4A molecular sieve, a 1.5 m. column packed with freshly prepared, finely divided copper (B.T.S. catalyst), and a second 1.5 m. column packed with molecular sieve.

The autoclave was sealed and heated to the required temperature. Once the pressure had reached equilibrium, the catalyst components, in solution in toluene were pumped in. Except where indicated, the organoaluminum component was added first.

After the appropriate reaction time, the autoclave was cooled and vented. The stirrer was actuated for a further 30 minutes and the polymer, as a dry powder, was removed from the autoclave and analyzed.

The results are shown in Table IX.

The properties of the product polymers are shown in Table IX-A.

TABLE IX

| Example | Organometallic compound | Oxime or hydroxy ester | Transition metal compound | Concentration of transition metal compound, mmoles/liter | Molar ratio Al/transition metal | Vinyl chloride, parts by volume | Temperature, °C. | Reaction time, hrs. | Conversion, percent | Catalyst activity, g./mmole of transition metal/hour |
|---|---|---|---|---|---|---|---|---|---|---|
| 89 a | Al(C₂H₅)₃ | Acetoxime | TiCl₄ | 3.3 | 3:1 | 3 | 65 | 1.5 | 18.2 | 33.2 |
| 90 a | Al(C₂H₅)₃ | do | TiCl₄ | 3.3 | 3:1 | 3 | 80 | 1.75 | 12.8 | 20.0 |
| 91 a | Al(C₂H₅)₃ | do | TiCl₄ | 2.5 | 3:1 | 4 | 72 | 2.0 | 7.4 | 13.5 |
| 92 a | Al(C₂H₅)₃ | do | TiCl₄ | 3.8 | 3.3:1 | 4 | 70 | 0.25 | 5.5 | 80 |
| 93 a | Al(C₂H₅)₃ | do | TiCl₄ | 3.1 | 3.3:1 | 4 | 75 | 1.5 | 11.5 | 18 |
| 94 a | Al(C₂H₅)₃ | do | TiCl₄ | 2.5 | 3.3:1 | 4 | 60 | 4.5 | 30.3 | 16.3 |
| 95 a | Al(C₂H₅)₃ | do | TiCl₄ | 2.5 | 4:1 | 4 | 60 | 5.25 | 24.7 | 14.5 |
| 96 a | Al(C₂H₅)₃ | do | TiCl₄ | 2.5 | 3.5:1 | 4 | 60 | 11.0 | 30.3 | 10.0 |
| 97 a | Al(C₂H₅)₃ | do | TiCl₄ | 2.5 | 3.5:1 | 4 | 60 | 6.0 | 19.2 | 11.7 |
| 98 b | Al(C₂H₅)₃ | do | TiCl₄ | 2.0 | 3.5:1 | 5 | 60 | 7.0 | 8.8 | 5.7 |
| 99 | Al(C₂H₅)₃ | do | TiCl₄ | 3.3 | 3.5:1 | 4.5 | 70 | 6.0 | 17.0 | 7.8 |
| 100 | Al(C₂H₅)₃ | do | TiCl₄ | 2.0 | 3:1 | 5 | 75 | 6.0 | 9.9 | 7.5 |
| 101 | Al(C₂H₅)₃ | do | TiCl₄ | 2.0 | 3.5:1 | 5 | 70 | 8.0 | 27.5 | 15.6 |
| 102 | Al(C₂H₅)₃ | do | TiCl₄ | 1.8 | 3.1:1 | 5 | 60 | 5.0 | 13.7 | 13.9 |
| 103 | Al(C₂H₅)₃ | do | TiCl₄ | 2.9 | 3.5:1 | 3.5 | 60 | 5.0 | 15.7 | 10.0 |
| 104 | Al(C₂H₅)₃ | do | TiCl₄ | 2.0 | 3:1 | 5 | 60 | 6.0 | 18.3 | 13.8 |
| 105 | Al(C₂H₅)₃ | do | TiCl₄ | 1.0 | 3:1 | 5 | 60 | 9.5 | 13.2 | 12.6 |
| 106 | Al(C₂H₅)₃ | do | TiCl₄ | 1.0 | 3:1 | 5 | 60 | 22.0 | 12.6 | 5.2 |
| 107 | Al(C₂H₅)₃ | do | TiCl₄ | 1.5 | 3:1 | 5 | 50 | 13.0 | 17.6 | 8.2 |
| 108 | Al(C₂H₅)₃ | do | TiCl₄ | 1.5 | 3:1 | 5 | 50 | 21.0 | 50.5 | 14.6 |
| 109 | Al(C₂H₅)₃ | do | TiCl₄ | 1.0 | 3:1 | 5 | 50 | 17.5 | 27.5 | 14.3 |
| 110 | Al(C₂H₅)₃ | do | TiCl₄ | 0.5 | 3:1 | 5 | 50 | 19.5 | 8.8 | 8.2 |
| 111 | Al(C₂H₅)₃ | do | TiCl₄ | 0.8 | 3:1 | 4 | 50 | 19.0 | 16.5 | 13.2 |
| 112 | Al(C₂H₅)₃ | do | TiCl₄ | 1.0 | 3:1 | 3 | 50 | 47.0 | 15.9 | 5.1 |
| 113 | Al(C₂H₅)₃ | do | TiCl₄ | 0.6 | 3:1 | 5 | 50 | 12.0 | 15.4 | 19.4 |
| 114 c | Al(C₂H₅)₃ | do | TiCl₄ | 0.8 | 3:1 | 5 | 50 | 19.0 | 24.8 | 14.8 |
| 115 | Al(C₂H₅)₃ | do | TiCl₄ | 0.6 | 3:1 | 5 | 50 | 20.5 | 14.3 | 10.6 |
| 116 | Al(C₂H₅)₃ | do | TiCl₄ | 0.6 | 3:1 | 5 | 50 | 16.5 | 13.7 | 12.6 |
| 117 | Al(C₂H₅)₃ | do | TiCl₄ | 0.6 | 3:1 | 5 | 50 | 24.5 | 16.7 | 10.3 |
| 118 | Al(C₂H₅)₃ | do | TiCl₄ | 0.6 | 3:1 | 5 | 50 | 18.0 | 24.2 | 20.4 |
| 119 | Al(C₂H₅)₃ | do | TiCl₄ | 0.4 | 3:1 | 5 | 50 | 28.5 | 26.0 | 20.4 |
| 120 | Al(C₂H₅)₃ | do | TiCl₄ | 0.4 | 3:1 | 5 | 50 | 19.5 | 10.5 | 12.1 |
| 121 | Al(C₂H₅)₃ | do | TiCl₄ | 0.4 | 3:1 | 5 | 55 | 19.5 | 10.5 | 12.1 |
| 122 | Al(C₂H₅)₃ | do | TiCl₄ | 0.4 | 3:1 | 5 | 50 | 22.0 | 4.4 | 9.1 |
| 123 | Al(C₂H₅)₃ | do | TiCl₄ | 0.4 | 3:1 | 5 | 50 | 48.0 | 14.3 | 6.8 |
| 124 | Al(C₂H₅)₃ | do | TiCl₄ | 0.8 | 3:1 | 5 | 60 | 16.0 | 5.5 | 3.9 |
| 125 | Al(C₂H₅)₃ | do | TiCl₄ | 1.1 | 3:1 | 4.5 | 60 | 16.5 | 14.3 | 7.9 |
| 126 | Al(C₂H₅)₃ | do | TiCl₄ | 1.0 | 3:1 | 5 | 60 | 19.0 | 14.3 | 6.9 |
| 127 | Al(C₂H₅)₃ | do | TiCl₄ | 1.0 | 3:1 | 5 | 60 | 70.0 | 28.6 | 3.7 |
| 128 | Al(C₂H₅)₃ | do | TiCl₄ | 1.0 | 3:1 | 5 | 60 | 22.25 | 16.5 | 6.8 |
| 129 | Al(C₂H₅)₃ | do | TiCl₄ | 1.0 | 3:1 | 5 | 60 | 17.0 | 31.9 | 17.1 |
| 130 | Al(C₂H₅)₃ | do | TiCl₄ | 1.0 | 3:1 | 5 | 60 | 23.5 | 41.7 | 16.2 |
| 131 | Al(C₂H₅)₃ | do | TiCl₄ | 1.0 | 3:1 | 5 | 50 | 18.5 | 5.5 | 2.7 |
| 132 | Al(C₂H₅)₃ | do | TiCl₄ | 1.0 | 3:1 | 5 | 50 | 43.0 | 50.5 | 10.7 |
| 133 | Al(C₂H₅)₃ | do | TiCl₄ | 1.0 | 3:1 | 5 | 50 | 16.5 | 28.6 | 15.8 |
| 134 | Al(C₂H₅)₃ | do | TiCl₄ | 1.0 | 3:1 | 5 | 50 | 24.0 | 50.5 | 19.2 |
| 135 | Al(C₂H₅)₃ | 2-acetoxyethanol | VOCl₃ | 0.6 | 3:1 | 5 | 50 | 18.0 | 18.7 | 15.6 |
| 136 | Al(C₂H₅)₃ | do | VOCl₃ | 0.4 | 3:1 | 5 | 50 | 24.0 | 6.6 | 6.3 |
| 137 | Al(C₂H₅)₃ | do | VOCl₃ | 0.6 | 3:1 | 5 | 50 | 24.0 | 7.2 | 4.5 |
| 138 | Al(C₂H₅)₃ | do | VOCl₄ | 1.0 | 3:1 | 5 | 50 | 18.0 | 2.2 | 1.1 |
| 139 | Al(C₂H₅)₃ | do | VOCl₃ | 0.6 | 3:1 | 5 | 50 | 41.0 | 11.0 | 4.1 |
| 140 | Al(C₂H₅)₃ | Ethyl lactate | VOCl₃ | 1.0 | 3:1 | 5 | 50 | 23.0 | 10.0 | 3.9 |
| 141 | Al(C₂H₅)₃ | Cyclohexanone oxime | TiCl₄ | 0.6 | 3:1 | 5 | 50 | 24.0 | 13.2 | 8.4 |
| 142 | Al(C₂H₅)₃ | do | TiCl₄ | 0.6 | 3:1 | 5 | 50 | 16.5 | 6.6 | 6.1 |
| 143 | Al(C₂H₅)₃ | do | TiCl₄ | 1.0 | 3:1 | 5 | 50 | 17.0 | 6.6 | 5.9 |
| 144 | Al(C₂H₅)₃ | Acetaldoxime | TiCl₄ | 0.6 | 3:1 | 5 | 50 | 18.5 | 0.5 | 0.3 |
| 145 | Al(C₂H₅)₃ | do | TiCl₄ | 1.0 | 3:1 | 5 | 50 | 23.0 | 3.3 | 1.3 |
| 146 | Al(C₂H₅)₃ | Benzophenone oxime | TiCl₄ | 0.6 | 3:1 | 5 | 50 | 18.0 | 3.8 | 3.2 |
| 147 | Al(C₂H₅)₃ | Acetophenone oxime | TiCl₄ | 0.6 | 3:1 | 5 | 50 | 23.5 | 5.5 | 3.7 |
| 148 | Al(C₂H₅)₃ | Propionaldoxime | TiCl₄ | 0.8 | 3:1 | 5 | 50 | 18.5 | 6.6 | 4.1 |
| 149 | Al(C₂H₅)₃ | do | TiCl₄ | 0.6 | 3:1 | 5 | 50 | 17.0 | 3.3 | 2.9 |
| 150 | Al(C₂H₅)₃ | do | TiCl₄ | 1.0 | 3:1 | 5 | 50 | 17.5 | 10.8 | 5.6 |
| 151 | Al(C₂H₅)₃ | Formaldoxime | TiCl₄ | 1.0 | 3:1 | 5 | 50 | 19.0 | 12.6 | 6.0 |
| 152 | Al(C₂H₅)₃ | Diethylketoxime | TiCl₄ | 1.0 | 3:1 | 5 | 50 | 18.5 | 14.3 | 7.0 |
| 153 | Al(C₂H₅)₃ | Diacetyldioxime | TiCl₄ | 1.0 | 3:1 | 5 | 60 | 16.5 | 4.4 | 2.5 |
| 154 | Al(C₂H₅)₃ | Furfuraldoxime | TiCl₄ | 1.0 | 3:1 | 5 | 50 | 16.0 | 2.7 | 1.6 |
| 155 | Al(C₂H₅)₃ | Benzaldoxime | TiCl₄ | 1.0 | 3:1 | 5 | 50 | 15.0 | 1.6 | 1.0 |
| 156 d e | Al(C₂H₅)₃ | Acetoxime | TiCl₄ | 1.0 | 3:1 | 5 | 50 | 17.5 | 14.3 | 7.2 |
| 157 d e | Al(C₂H₅)₃ | do | TiCl₄ | 1.0 | 7:1 | 5 | 50 | 15.0 | 51.5 | 31.3 |
| 158 | Al(C₂H₅)₃ | p-Bromoacetophenone oxime | TiCl₄ | 1.0 | 3:1 | 5 | 50 | 24.0 | 15.4 | 5.8 |
| 159 f | Al(C₂H₅)₃ | Acetoxime | TiCl₄ | 1.0 | 3:1 | 5 | 50 | 17.0 | 13.2 | 7.1 |
| 160 g | Al(C₂H₅)₃ | do | TiCl₄ | 1.0 | 3:1 | 5 | 50 | 18.0 | 25.2 | 12.8 |
| 161 h | Al(C₂H₅)₃ | 2-acetoxyethanol | VOCl₃ | 1.0 | 3:1 | 5 | 50 | 17.0 | 13.2 | 7.1 | a Catalyst components added simultaneously.
b Catalyst components premixed and the combined solution added to the autoclave.
c 0.6 mmole of TiCl₄ per litre of vinyl chloride added initially, followed by another 0.2 mmole per litre after 8 hours reaction.
d Titanium supported on SiO₂, 1% by weight.
e Transition metal component added first.
f Titanium supported on Al₂O₃, 7.1% by weight.
g Titanium supported on SiO₂, 3.2% by weight.
h Titanium supported on SiO₂, 9.33% by weight.

TABLE IX-A.—POLYMER PROPERTIES

| Ex. | K value | Ionic chloride, percent | Al (p.p.m.) | Fe (p.p.m.) | Transition metal (p.p.m.) | Vicat softening point, °C |
|---|---|---|---|---|---|---|
| 89 | 48 | 1.06 | 760 | 80 | 300 | |
| 90 | 42 | 0.86 | 1,100 | 80 | 540 | |
| 91 | 48 | 0.90 | 460 | 60 | 60 | |
| 92 | <35 | 1.27 | 5,900 | 440 | 1,700 | |
| 93 | 44 | 0.51 | 1,100 | 200 | 300 | |
| 94 | 54 | 0.87 | 890 | 180 | 210 | |
| 95 | 50 | 0.81 | 550 | 90 | 80 | |
| 96 | 51 | 0.94 | 260 | 60 | 20 | |
| 97 | 50 | 0.83 | 410 | 70 | 70 | |
| 98 | 50 | 2.06 | 1,300 | 80 | 540 | |
| 99 | | 1.11 | 1,300 | 130 | 650 | |
| 100 | 41 | 1.39 | | 150 | 560 | |
| 101 | 43 | 1.61 | 430 | 56 | 280 | |
| 102 | 48 | 0.88 | 540 | 36 | 520 | |
| 103 | 48 | 1.26 | | 110 | 420 | |
| 104 | 51 | 1.80 | | 140 | 480 | |
| 105 | 54 | 3.02 | | 190 | 490 | 100 |
| 106 | 40 | 0.97 | 540 | 40 | 240 | 99 |
| 107 | 59 | 1.38 | 670 | 20 | 420 | |
| 108 | 60 | 1.47 | 260 | 30 | | 101 |
| 109 | 64 | 0.75 | 500 | 60 | 390 | 103 |
| 110 | 63 | 0.56 | 370 | 50 | 320 | |
| 111 | 68 | 0.73 | 360 | 20 | 130 | |
| 112 | 72 | 1.02 | 140 | 10 | 70 | |
| 113 | 57 | 0.96 | 540 | 80 | 130 | |
| 114 | 69 | 1.49 | 210 | 15 | 80 | |
| 115 | 69 | 1.46 | 1,100 | 30 | 150 | |
| 116 | 65 | 1.92 | 330 | 29 | 180 | |
| 117 | 64 | 1.53 | 270 | 5 | 120 | |
| 118 | 63 | 1.62 | 120 | 23 | 120 | |
| 119 | 60 | 1.88 | 120 | 27 | 50 | |
| 120 | 60 | 1.14 | 340 | 47 | 80 | |
| 121 | 62 | 1.70 | 270 | | 76 | |
| 122 | 64 | 0.30 | 100 | 14 | 95 | |
| 123 | 67 | 1.96 | 70 | | 35 | |
| 124 | 52 | 0.77 | 2,060 | 10 | 830 | |
| 125 | 56 | 0.32 | 250 | 6 | 60 | |
| 126 | 58 | 0.32 | 610 | 52 | 270 | |
| 127 | 49 | | | | | |
| 128 | 53 | | | | | |
| 129 | 55 | | | | | |
| 130 | 59 | | | | | |
| 131 | 58 | | | | | |
| 132 | | | | | | |
| 133 | 62 | | | | | |
| 134 | 64 | 0.63 | 130 | 3 | 390 | |
| 135 | 65 | 0.57 | 140 | 14 | 140 | |
| 136 | 64 | 0.15 | 270 | 14 | 140 | |
| 137 | 64 | 0.21 | 950 | 56 | 450 | |
| 138 | | 0.31 | 300 | 20 | 180 | |
| 139 | 64 | 0.67 | 330 | 71 | 470 | |
| 140 | 58 | 1.00 | 530 | 11 | 470 | |
| 141 | 65 | | | | | |
| 142 | 64 | 0.16 | 330 | 10 | 100 | |
| 143 | 56 | 2.39 | 660 | 40 | 330 | |
| 144 | 51 | 0.55 | 140 | 70 | 1,470 | |
| 145 | 54 | 0.32 | 60 | 100 | 970 | |
| 146 | 62 | 0.41 | 950 | 40 | 680 | |
| 147 | 62 | 0.58 | 600 | 30 | 290 | |
| 148 | 61 | 0.33 | 710 | 34 | 280 | |
| 149 | 52 | 0.73 | 900 | 110 | 510 | |
| 150 | 59 | 0.84 | 430 | 42 | 300 | |
| 151 | 69 | 0.85 | 350 | 12 | 200 | |
| 152 | 62 | 0.61 | 250 | 8 | 140 | |
| 156 | 56 | | | | | |
| 157 | 59 | | | | | |

For comparison a commercially available poly(vinyl chloride) ("Corvic" Grade D50/16) had a Vicat softening point of 93° C. ("Corvic" is a registered trademark of Imperial Chemical Industries Ltd.)

What we claim is:

1. A process for the polymerization of a monomer selected from the group consisting of vinyl halides and vinylidene halides by contacting the monomer at a temperature of −25° to 130° C. with a catalyst composition containing as first component a compound of titanium or vanadium and as a second component the product of reacting an organoaluminum or organozinc compound with an oxime or a hydroxyester, said catalyst composition having an atomic ratio of aluminum or zinc to titanium or vanadium in the range of 1:1 to 10:1 and a concentration in the monomer in the range of about 0.0025 to about 0.1 mole percent of titanium or vanadium.

2. The process of claim 1 in which the oxime is a ketoxime.

3. The process of claim 2 in which the oxime includes a methyl group.

4. The process of claim 3 in which the oxime is acetoxime.

5. The process of claim 1 in which the oxime is formaldoxime, acetaldoxime, propionaldoxime, acrolein oxime, crotonaldoxime, furfuraldoxime, glyoxime, diacetyldioxime, acetoxime, diethylketoxime, cyclohexanone oxime, acetophenone oxime or benzophenone oxime.

6. The process of claim 1 in which the hydroxy ester is a partial ester of a polyhydric alcohol.

7. The process of claim 6 in which the hydroxy ester is a monocarboxylate of ethylene glycol.

8. The process of claim 7 in which the hydroxy ester is 2-acetoxyethanol.

9. The process of claim 1 in which the transition metal compound is a halide, oxyhalide, alkoxide, alkoxyhalide, alkoxyacetyl-acetonate, acetoxyhalide, acetylacetonate, alkoxyalcoholate or aminoalcoholate.

10. The process of claim 9 in which the compound of titanium or vanadium compound is a halide.

11. The process of claim 1 in which the titanium or vanadium is in a high oxidation state.

12. The process of claim 1 in which the first component is a compound of titanium.

13. The process of claim 1 in which organoaluminum or organozinc compound includes at least one hydrocarbyl group.

14. The process of claim 13 in which each hydrocarbyl group is an alkyl group.

15. The process of claim 1 in which only one ligand in the organoaluminum or organozinc compound is derived from an oxime or hydroxy ester.

16. The process of claim 1 in which the second component of the catalyst is formed during the polymerization reaction from a mixture of the organoaluminum or organozinc compound and the oxime or hydroxy ester.

17. The process of claim 1 in which the second component is an aluminum compound.

18. The process of claim 1 in which the temperature is from 40° C. to 70° C.

19. The process of claim 1 when conducted at the autogenous pressure of the monomer.

20. The process of claim 1 in which the catalyst is in solution in the monomer.

21. The process of claim 1 in which the catalyst composition is prepared immediately before use.

22. The process of claim 1 in which the second component of the catalyst is contacted with the monomer not later than the addition of the first component.

23. The process of claim 1 in which the monomer is vinyl chloride.

24. The process of claim 23 in which the vinyl chloride has been prepared from ethylene.

25. A catalyst suitable for use in the polymerization of vinyl halides or vinylidene halides which consists of
   (a) a compound of titanium or vanadium, and either
   (b) an organoaluminum or organozinc compound containing a ligand derived from an oxime or a hydroxy ester, or
   (c) a mixture of an organoaluminum or organozinc compound and an oxime or a hydroxy ester, said catalyst having an atomic ratio of aluminum or zinc to titanium or vanadium in the range of 1:1 to 10:1.

26. A composition as claimed in claim 25 in which the titanium or vanadium is in a high oxidation state.

27. A composition as claimed in claim 25 in which only one ligand in the organoaluminum or organozinc compound is derived from an oxime or hydroxy ester.

References Cited

UNITED STATES PATENTS

| | | | |
|---|---|---|---|
| 3,081,286 | 3/1963 | McKinnis | 260—93.7 |
| 3,116,272 | 12/1963 | Stewart | 260—94.3 |
| 3,219,652 | 11/1965 | Hill | 260—94.9 |
| 3,380,981 | 4/1968 | Miller | 260—93.7 |
| 3,514,433 | 5/1970 | Nicco | 260—88.2 |
| 3,535,269 | 10/1970 | Tanaka | 252—429 |
| 3,535,401 | 10/1970 | Calderon | 260—683 |
| 3,641,188 | 2/1972 | Yoo | 260—683.15 D |

JOSEPH L. SCHOFER, Primary Examiner

J. KIGHT, Assistant Examiner

U.S. Cl. X.R.

252—429 B, 431 R, N, 92.8